US008553300B2

(12) United States Patent
Oki

(10) Patent No.: US 8,553,300 B2
(45) Date of Patent: Oct. 8, 2013

(54) IMAGE FORMING APPARATUS CONFIGURED TO REDUCE THE NUMBER OF SHEETS TO BE OUTPUT FOR GRADATION CORRECTION WHILE MAINTAINING GRADATION STABILITY

(75) Inventor: Makoto Oki, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 304 days.

(21) Appl. No.: 13/079,147

(22) Filed: Apr. 4, 2011

(65) Prior Publication Data

US 2011/0242609 A1 Oct. 6, 2011

(51) Int. Cl.
*H04N 1/46* (2006.01)

(52) U.S. Cl.
USPC ............. 358/504; 358/1.9; 358/518; 358/521

(58) Field of Classification Search
None
See application file for complete search history.

(56) References Cited

U.S. PATENT DOCUMENTS

| 6,864,995 | B2 * | 3/2005 | Nogiwa et al. | 358/1.9 |
| 6,873,441 | B1 * | 3/2005 | Kuwabara et al. | 358/3.26 |
| 7,236,276 | B2 * | 6/2007 | Nakane et al. | 358/521 |
| 7,557,964 | B2 * | 7/2009 | Smith et al. | 358/406 |
| 7,652,790 | B2 * | 1/2010 | Touura | 358/1.9 |
| 8,144,365 | B2 * | 3/2012 | Kita et al. | 358/1.9 |
| 2004/0160618 | A1 * | 8/2004 | Nogiwa | 358/1.9 |
| 2009/0251715 | A1 * | 10/2009 | Kita | 358/1.9 |

FOREIGN PATENT DOCUMENTS

JP 2005-167550 6/2005

* cited by examiner

*Primary Examiner* — Dung Tran
(74) *Attorney, Agent, or Firm* — Finnegan, Henderson, Farabow, Garrett & Dunner, LLP

(57) ABSTRACT

An image forming apparatus includes: an image forming section; a first density sensor; a second density sensor; and a control section to control the image forming section to form a first gradation pattern image including patches having different densities on the image carrier, to execute gradation correction of the image forming section based on a detection result obtained with the first density sensor, to control the image forming section to print a second gradation pattern image including patches having different densities on the sheet, and to execute the gradation correction based on a detection result obtained with the second density sensor, and wherein the control section adds a gradation correction result by the first density sensor to a gradation correction result by the second density sensor according to a predetermined ratio, and executes the gradation correction based on an addition result.

4 Claims, 10 Drawing Sheets

IMAGE FORMING APPARATUS CONFIGURED TO REDUCE THE NUMBER OF SHEETS TO BE OUTPUT FOR GRADATION CORRECTION WHILE MAINTAINING GRADATION STABILITY

BACKGROUND

1. Field of the Invention

The present invention relates to an image forming apparatus.

2. Description of Related Art

In general, gradation stability is very important for a printer. A conventional image forming apparatus of an electrophotographic system secures the gradation stability by measuring a toner density on an image carrier such as a photoconductive drum and an intermediate transfer belt to execute a gradation correction based on a measurement result thereof. However, since this method does not consider influences of image transfer (secondary transfer) and fixation from the intermediate transfer belt to a sheet, the gradation stability cannot be ensured on an actual output sheet.

There has been therefore used a method for executing gradation correction of a printer by forming a gradation pattern image including plural density patches on a sheet to measure the gradation pattern image on the output sheet by a density sensor (see Japanese Patent Application Laid-Open Publication No. 2005-167550). Because of using the actual output sheet to execute the gradation correction every predetermined interval, a stable output result can be obtained.

However, since the method which forms the gradation pattern image on the sheet needs to actually output the sheet, a waste sheet is generated every time correction is performed. Because limited number of patches can be formed on one sheet, when using a pattern of 32 gradations for example, outputting gradation patterns by using four sheets of A4 size becomes necessary (see FIG. 4).

Especially in Production Print (PP) field, constant image qualities are required for providing prints as commercial products, but outputting a volume of waste paper is not preferable.

SUMMARY

The present invention has been made in view of the above problems of conventional techniques, and the object of the present invention is to reduce the number of sheets to be output for gradation correction while maintaining gradation stability.

In order to solve at least one of the above-mentioned problems, according to one aspect of the present invention, there is provided an image forming apparatus including:

an image forming section to form an toner image on an image carrier, and to transfer the formed toner image on a sheet;

a first density sensor to detect a density of the toner image formed on the image carrier;

a second density sensor to detect a density of the toner image transferred on the sheet; and a control section to control the image forming section to form a first gradation pattern image including a plurality of patches having different densities on the image carrier, to execute gradation correction of the image forming section based on a detection result obtained by detecting the density of each of the patches included in the first gradation pattern image formed on the image carrier with the first density sensor, to control the image forming section to print a second gradation pattern image including a plurality of patches having different densities on the sheet, and to execute gradation correction of the image forming section based on a detection result obtained by detecting the density of each of the patches included in the second gradation pattern image printed on the sheet with the second density sensor, and wherein the control section adds a gradation correction result by the first density sensor to a gradation correction result by the second density sensor according to a predetermined ratio, and executes gradation correction of the image forming section based on an addition result.

Preferably, the predetermined ratio varies depending on the density, and a ratio of the gradation correction result by the second density sensor gets higher on a lower density side.

Preferably, the predetermined ratio can be specified by a user.

Preferably, the gradation correction of the image forming section is performed every time printings of the predetermined number of times are executed by the image forming section.

BRIEF DESCRIPTION OF THE DRAWINGS

The present invention will become more fully understood from the detailed description given hereinbelow and the appended drawings, and thus are not intended as a definition of the limits of the present invention, and wherein.

DETAILED DESCRIPTION OF THE PREFERRED EMBODIMENT

An embodiment of an image forming apparatus of the present invention will be described.

Figure 1:
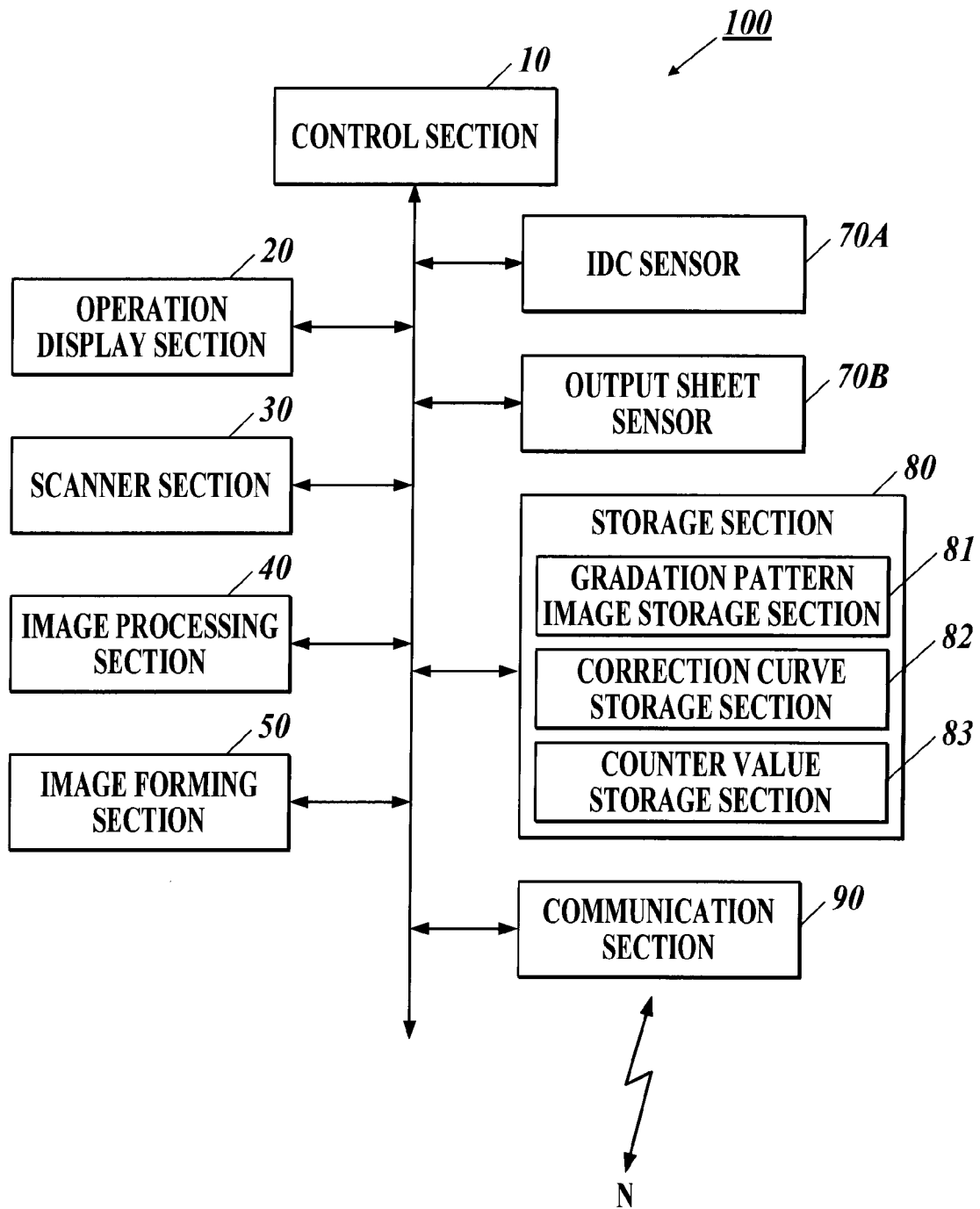
FIG. 1 is a block diagram showing a functional configuration of an image forming apparatus according to an embodiment of the present invention.

FIG. 1 shows a functional configuration of an image forming apparatus 100 according to this embodiment. The image forming apparatus 100 is a MFP (multifunction peripheral) equipped with a copying function, an image reading function, and printing function, and is a color image forming apparatus of an electrophotographic system.

As shown in FIG. 1, the image forming apparatus 100 configured to include a control section 10, an operation display section 20, a scanner section 30, an image processing section 40, an image forming section 50, an IDC (Image Density Control) sensor 70A as a first density sensor, an output sheet sensor 70B as a second density sensor, a storage section 80, a communication section 90, and the like, which are connected to one another by a bus.

The control section 10 is composed of a CPU (Central Processing Unit), a ROM (Read Only Memory), a RAM (Random Access Memory), and the like. The CPU reads a system program and various processing program stored in the ROM according to an operation signal input from the operation display section or an instruction signal received from the communication section 90 to expand the read programs in the RAM, and centrally controls operations of the respective sections of the image forming apparatus 100 according to the expanded program.

The operation display section 20 is composed of a LCD (Liquid Crystal Display), and displays various operation buttons, an apparatus status, an operating condition of each function, and the like on a display screen according to an instruction of a display signal input from the control section 10. The display screen of the LCD is covered with a touch panel of a pressure sense type (a film resistance type) in which transparent electrodes are arranged in a reticular pattern so that a position coordinate, which is depressed by a finger, a touch pen, or the like, is detected as a voltage value to output a detected position signal to the control section 10 as the operation signal. The operation display section 20 is equipped with the various operation buttons such as numeral buttons and a start button, and outputs the operation signal by button operation to the control section 10.

For example, the operation display section 20 is used when specifying a correction interval to be a basis of timing of a gradation correction.

The operation display section 20 is also used when specifying an adjustment value for determining a ratio (hereinafter referred to as a merge ratio) for adding a gradation correction result by the IDC sensor 70A to a gradation correction result by the output sheet sensor 70B.

The scanner section 30 is configured to include a scanner under a contact glass on which an original document is placed, and reads an image of the document. The scanner is composed of a light source, a CCD (Charge Coupled Device) image sensor, an A/D converter, and the like, reads the image of the document by forming an image of light which is irradiated from the light source, scanned on the document, and reflected thereon to perform photoelectric conversion, and performs A/D conversion to the read image to output the converted image to the image processing section 40.

The image processing section 40 performs image processes for correcting gradation characteristics of the image forming section 50, such as gamma correction and halftone processing, with respect to the image data read and obtained by the scanner section 30 and the image data received from the communication section 90, and outputs the image data to the image forming section 50. The operations of the image forming section 40 are executed by software processing by the CPU of the control section 10 in cooperation with the programs stored in the ROM.

The image forming section 50 forms the image on the sheet by the electrophotographic method based on the image data of YMCK output from the image processing section 40 to output the image-formed sheet.

Figure 2:
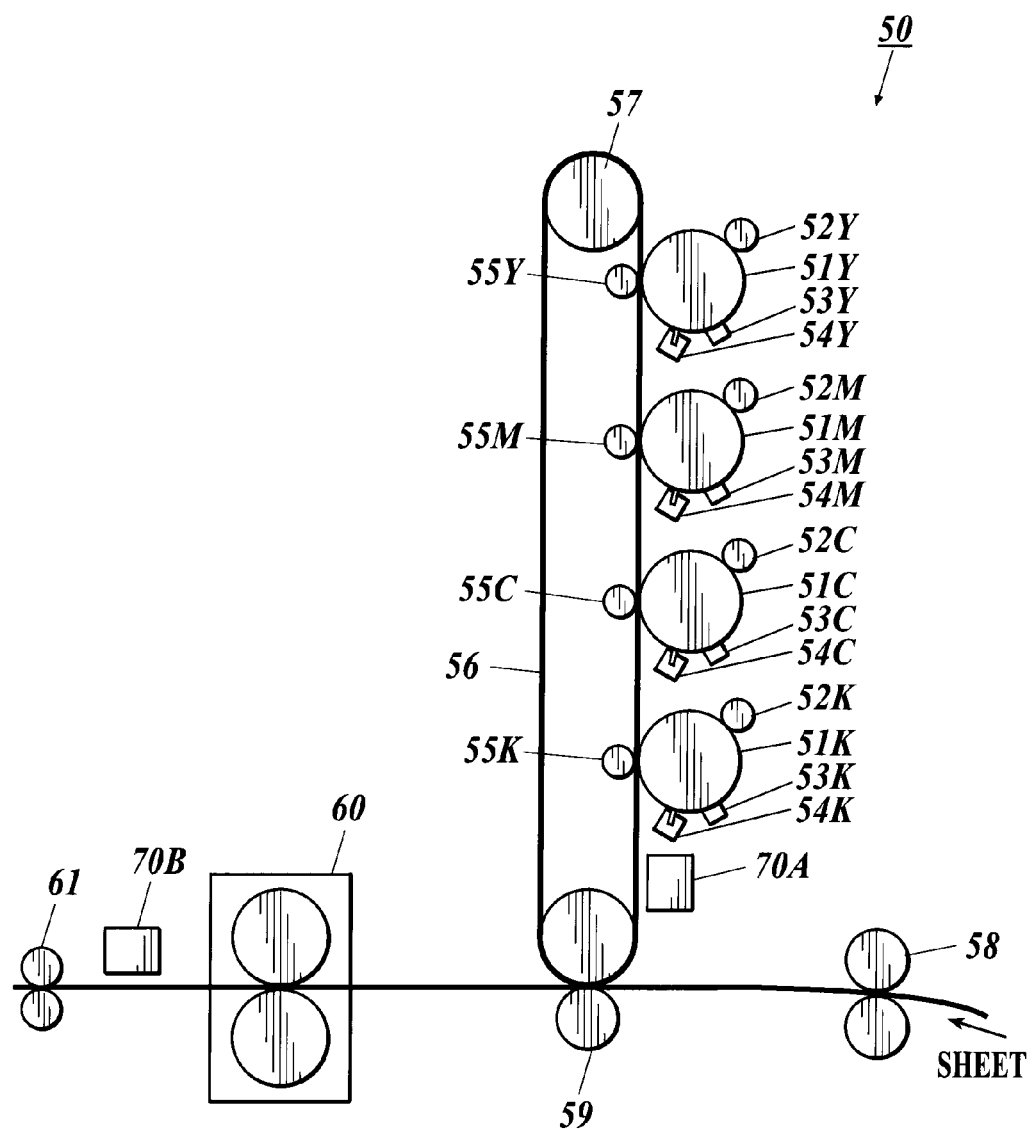
FIG. 2 is a diagram showing an internal configuration of an image forming section.

FIG. 2 shows an internal configuration of the image forming section 50. As shown in FIG. 2, the image forming section 50 is equipped with: photoconductive drums 51Y, 51M, 51C, 51K, developing units 52Y, 52M, 52C, 52K, charging units 53Y, 53M, 53C, 53K, cleaners 54Y, 54M, 54C, 54K, and primary transfer rollers 55Y, 55M, 55C, 55K, which are for respective colors of Y, M, C and K; an intermediate transfer belt 56; rollers 57; resist rollers 58; a second transfer belt 59; a fixation unit 60, and sheet ejection rollers 61.

Here, image formation in the image forming section 50 will be described.

The photosensitive drum 51Y rotates and the surface thereof is charged by the charging unit 53Y. Then, on the charged portion, a latent image of Y data input from the image processing section 40 is formed by exposure with a not-shown laser light source or the like. A toner image of yellow is then formed on the latent image portion by the developing unit 52Y. The toner image is transferred to the intermediate transfer belt 56 by pressure welding with the primary transfer roller 55Y. The toner image becomes a yellow image corresponding to the image data to be an output subject. The toner which is not transferred is removed by the cleaner 54Y.

Also the toner images of magenta, cyan, and black are formed and transferred respectively.

With rotations of the rollers 57 and the primary transfer rollers 55Y, 55M, 55C, 55K, the intermediate transfer belt 56 rotates, and the toner images of Y, M, C, and K are orderly transferred on the intermediate transfer belt 56 to be superimposed over one and another. With rotation of the resist roller 58, the sheet is conveyed from a not-shown feeding tray to the secondary transfer roller 59.

With rotations of the resist rollers 58 and the secondary transfer roller 59, the sheet passes through a pressure welding portion of the secondary transfer roller 59, and thereby the toner images of YMCK on the intermediate transfer belt 56 are transferred to the sheet respectively. In other words, the image forming section 50 has a function to form the toner image on the intermediate transfer belt 56 as an image carrier, and to transfer the formed toner image to the sheet. The sheet on which the toner images of YMCK are transferred passes through the fixation section 60. By applying pressure and heat with the fixation section 60, the toner images of YMCK are fixed on the sheet so that the color image is formed. The sheet on which the image is formed is conveyed to a not-shown sheet ejection tray with the sheet ejection roller 61.

In the case of both side printing, a one side printed sheet is turned over by a not-shown both side conveying unit, and the sheet is conveyed to the secondary transfer roller 59 with the resist roller 58 so that an image is formed on a surface on which no image is formed yet.

As shown in FIG. 2, the IDC sensor 70A is provided at a position opposed to the toner image formed on the intermediate transfer belt 56 as the image carrier to detect densities of the toner image. Concretely, the IDC sensor 70A outputs to the control section 10 a voltage value depending on a density of each patch included in a first gradation pattern image (see FIG. 3) formed on the intermediate transfer belt 56.

The IDC sensor 70A is equipped with a LED (Light Emitting Diode), a lens, a light receiving element, and the like. The IDC sensor 70A irradiates patches on the intermediate belt 56 on which the first gradation pattern image is formed with light from the LED, and receives reflected lights with the light receiving element through the lens. Then, the light receiving element outputs the voltage values depending on the reflected lights to the control section 10.

The output sheet sensor 70B detects densities of the toner image transferred on the sheet. Concretely, the output sheet sensor 70B outputs a voltage depending on a density of each of patches included in a second gradation pattern image (see FIG. 4) on the sheet on which the image has been formed by the image forming section 50, to the control section 10. As shown in FIG. 2, the output sheet sensor 70B is provided in a subsequent stage with respect to the fixation unit 60, namely downstream of the fixation unit 60 in a sheet conveying direction.

The output sheet sensor 70B is equipped with a LED, a lens, a light receiving element, and the like. The output sheet sensor 70B irradiates the patches on the sheet on which the second gradation pattern image is formed with light from the LED, and receives the reflected lights with the light receiving element through the lens. Then, the light receiving element outputs the voltage values depending on the reflected lights to the control section 10.

The storage section 80 is composed of a hard disk, flash memory, or the like, and stores the various pieces of data. The storage section 80 includes a gradation pattern image storage section 81, a correction curve storage section 82, and a counter value storage section 83.

Figure 3:
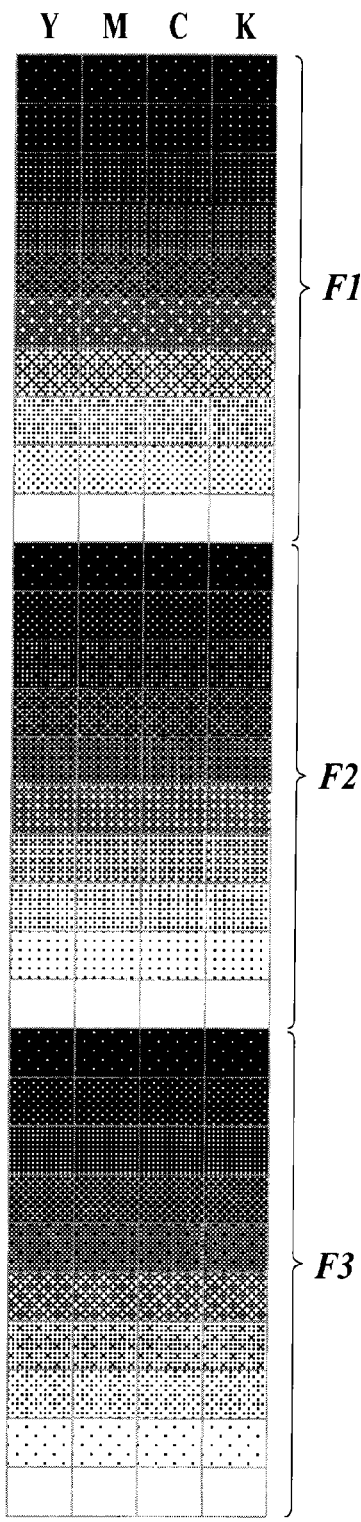
FIG. 3 is a diagram showing an example of a first gradation pattern image to be formed on an intermediate transfer belt.

The gradation pattern image storage section 81 stores YMCK data for forming the first gradation pattern image, and YMCK data for forming the second gradation pattern image. FIG. 3 shows an example of the first gradation pattern image to be formed on the intermediate transfer belt 56. The first gradation pattern image includes the plurality of patches having different densities for the respective colors of YMCK. Here, three gradation pattern images F1, F2, and F3 are used for a single gradation correction. Each of the gradation pattern images F1, F2, and F3 includes the patches of 10 gradations for each of the colors. However, in this regard, since the maximum density (gradation value: 255) and the minimum density (gradation value: 0) are common in the gradation pattern images F1, F2, and F3, the gradation pattern images F1, F2, and F3 include the patches of 26 gradations in total.

Figure 4:
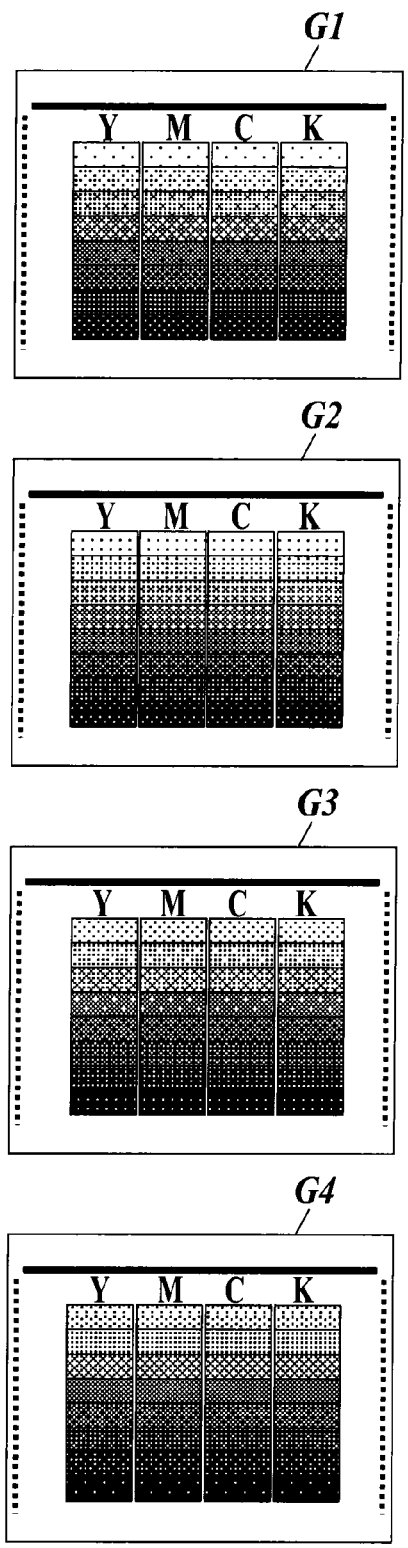
FIG. 4 is a diagram showing an example of a second gradation pattern image to be transferred on a sheet.

FIG. 4 shows an example of the second gradation pattern image to be transferred on the sheet. The second gradation pattern image includes the plurality of patches having different densities for the respective colors of YMCK. Here, four gradation pattern images G1, G2, G3, and G4 are used for a single gradation correction. The gradation pattern images G1, G2, G3, and G4 are different from one another, and each of the gradation pattern images G1, G2, G3, and G4 includes the patches having different densities within the range from the minimum density (gradation value: 0) to the maximum density (gradation value: 255). For example, the gradation values of the respective color patches included in the gradation pattern image G1 are 0, 32, 65, 98, 131, 164, 197, and 230, the gradation values of the respective color patches included in the gradation pattern image G2 are 8, 41, 74, 106, 139, 172, 205, and 238, the gradation values of the respective color patches included in the gradation pattern image G3 are 16, 49, 82, 115, 148, 180, 213, and 246, and the gradation values of the respective color patches included in the gradation pattern image G4 are 24, 57, 90, 123, 156, 189, 222, and 255.

Figure 5:
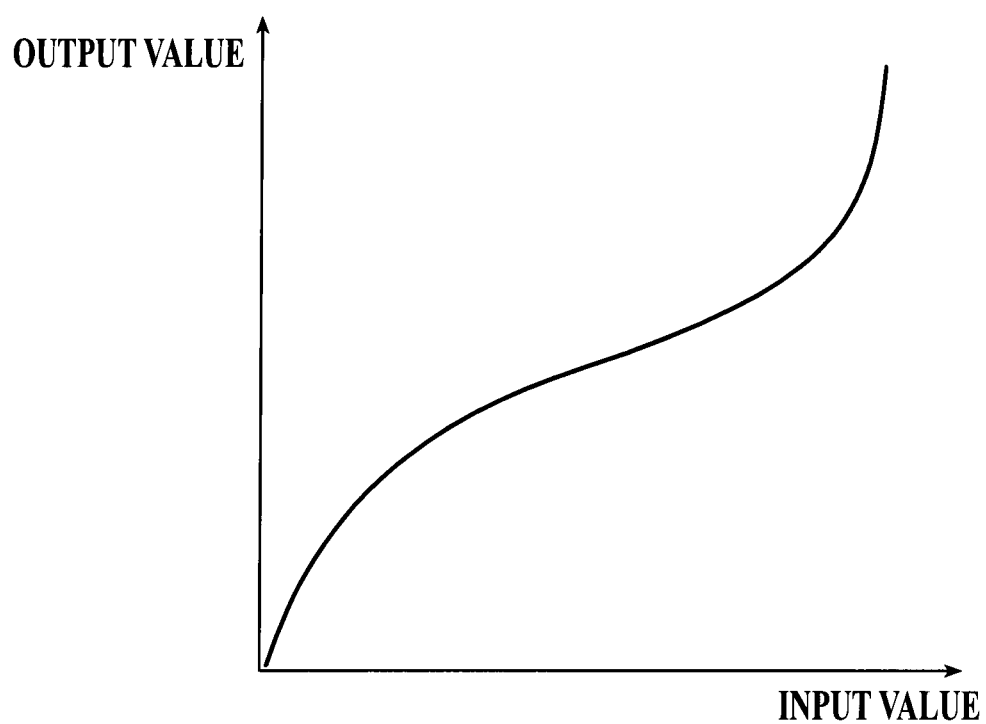
FIG. 5 is a diagram showing an example of a correction curve.

The correction curve storage section 82 stores the correction curve data to be used for correcting the gradation characteristics of the image forming section 50 for the respective colors of Y, M, C, and K. The correction curve is for executing gradation conversion for making the output densities linear with respect to the input values, and shown in FIG. 5, the input values are correlated to the output values respectively. The correction curve may be stored in a form of an operation expression with respect to the input values, or in a form of a LUT (Look Up Table) in which the input values are correlated to the output values respectively.

The counter value storage section 83 stores a counter value for counting the number of printings by the image forming section 50. In the case of single side printing, the counter value increases by one (1) when one sheet is output, and in the case of both side printing, the counter value increases by two when one sheet is output.

The storage section 80 stores also the correction value and the adjustment value specified by the operation display section 20.

The communication section 90 is composed of a modem, a LAN (Local Area Network) adaptor, a router, a TA (Terminal Adapter), and the like, and controls communication with each apparatus connected to the network N.

The control section 10 executes gradation correction of the image forming section 50 every time the printings of the predetermined number of times (correction interval) are executed by the image forming section 50.

The control section 10 reads the first gradation pattern image stored in the gradation pattern image storage section 81, controls the image forming section 50 to form the read first gradation pattern image on the intermediate transfer belt 56, and executes gradation correction of the image forming section 50 based on a detection result obtained by detecting the density of each of the patches included in the first gradation pattern image formed on the intermediate transfer belt 56 with the IDC sensor 70A. Specifically, the control section 10 creates the first correction curve to be used for correcting the gradation characteristics of the image forming section 50, based on the detection result by the IDC sensor 70A, and makes the correction curve storage section 82 store the first correction curve.

The control section 10 reads the second gradation pattern image stored in the gradation pattern image storage section 81, controls the image forming section 50 to print the read second gradation pattern image on the sheet, and executes gradation correction of the image forming section 50 based on a detection result obtained by detecting the density of each of the patches included in the second gradation pattern image printed on the sheet with the output sheet sensor 70B. Specifically, the control section 10 creates the second correction curve to be used for correcting the gradation characteristics of the image forming section 50, based on the detection result by the output sheet sensor 70B, and makes the correction curve storage section 82 store the second correction curve.

The control section 10 adds the gradation correction result (the first correction curve) by the IDC sensor 70A to the gradation correction result (the second correction curve) by the output sheet sensor 70B according to a predetermined ratio (merge ratio), and based on the addition result, performs gradation correction of the image forming section 50. Concretely, the control section 10 obtains a weighted average according to the merge ratio with respect to the output values of the first and second correction curve which correspond to the same input value, and creates a final correction curve. Then, the control section 10 corrects the gradation characteristics of the image forming section 50 using the final correction curve.

Figure 6:
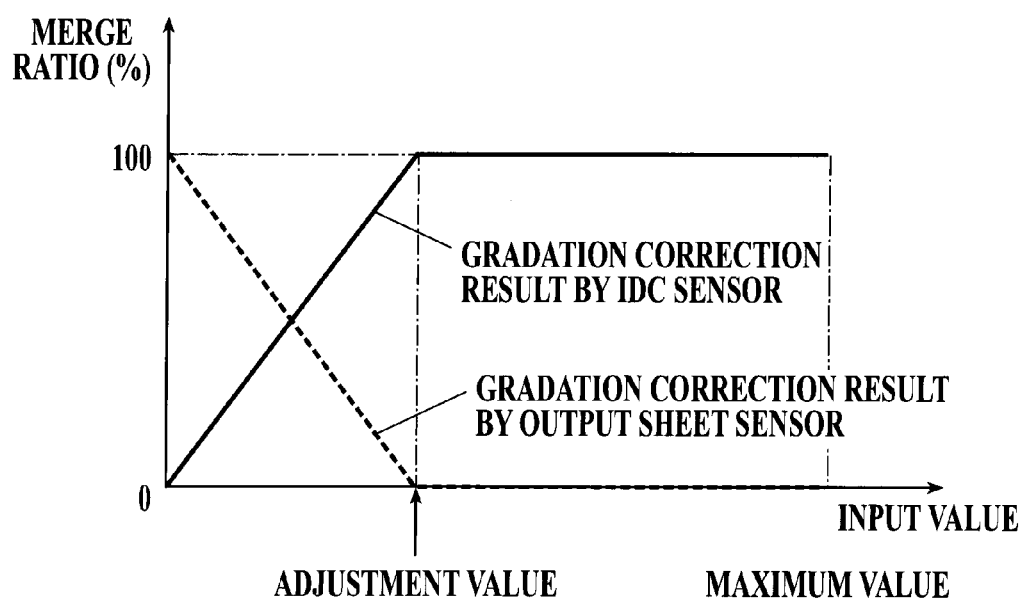
FIG. 6 is a diagram showing an example of a merge ratio between a gradation correction result by an IDC sensor and a gradation correction result by an output sheet sensor.

FIG. 6 shows an example of the merge ratio between the gradation correction result by the IDC sensor 70A and the gradation correction result by the output sheet sensor 70B. As shown in FIG. 6, when the range of the input values is from the minimum value to the adjustment value, the larger the input value, the higher the ratio of the gradation correction result by the IDC sensor 70A and the lower the ratio of the gradation correction result by the output sheet sensor 70B. In other word, the merge ratio varies depending on the density. The ratio of the gradation correction result by the output sheet sensor 70B gets higher on a lower density side. When the range of the input value is from the adjustment value to the maximum value, 100% of the gradation correction result by the IDC sensor 70A is used.

Next, the operation will be described.

Figure 7:
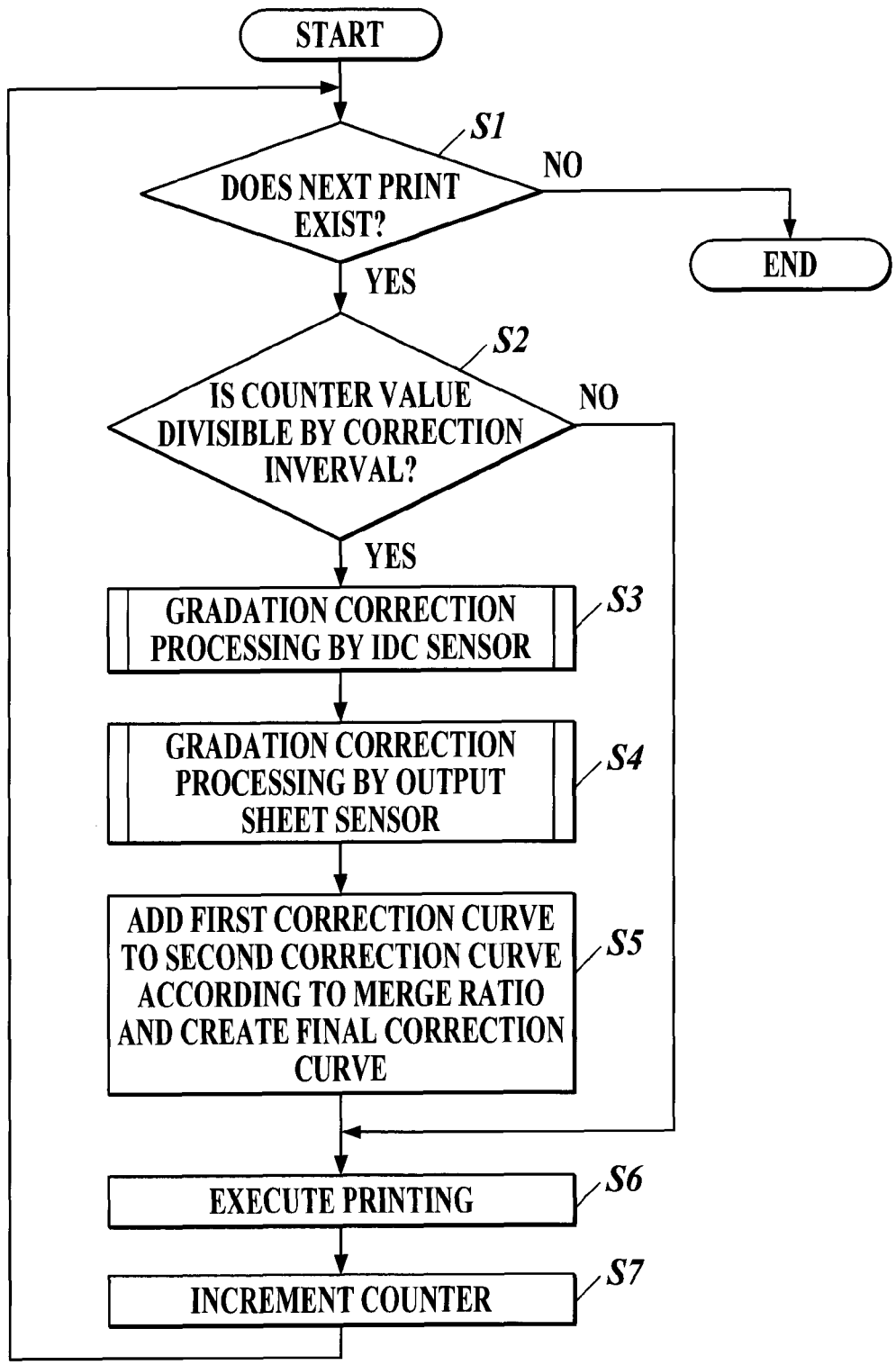
FIG. 7 is a flowchart showing processes to be executed in the image forming apparatus.

FIG. 7 is a flowchart showing processing to be executed in the image forming apparatus 100 of the embodiment. This processing is realized by software processing by the CPU of the control section 10 in cooperation with the programs stored in the ROM.

The correction interval and the adjustment value are previously specified by a user in the operation display section 20, and stored in the storage section 80.

Firstly, the control section 10 judges whether or not next print exists (Step S1). When the next print exists (Step S1: YES), the control section 10 judges whether or not the counter value of the counter value storage section 83 is divisible by the correction interval (Step S2).

When the counter value is divisible by the correction interval (Step S2: YES), the control section 10 executes gradation correction processing by the IDC sensor (Step S3).

Figure 8:
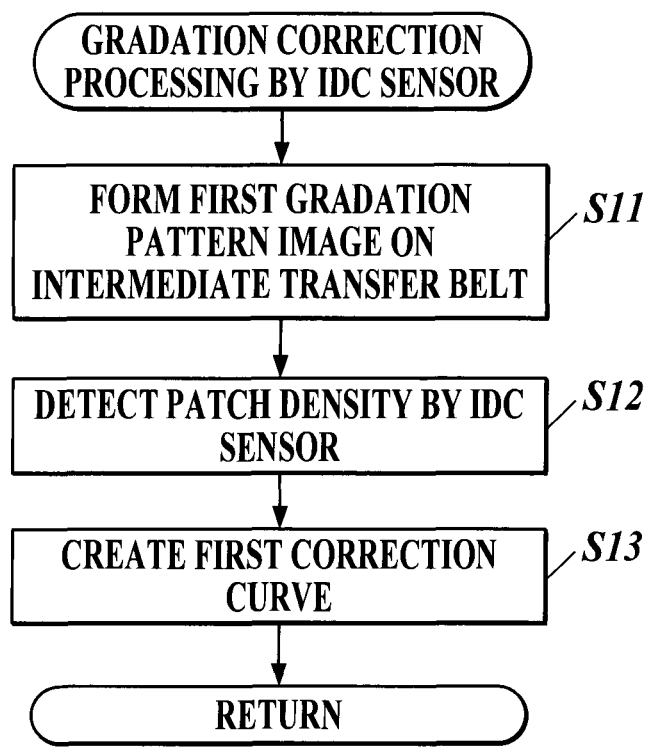
FIG. 8 is a flowchart showing a gradation correction processing by the IDC sensor.

With reference to FIG. 8, the gradation correction processing by the IDC sensor will be described.

Firstly, the control section 10 reads the first gradation pattern image from the gradation pattern image storage section 81, and controls the image forming section 50 to form the read first gradation pattern image on the intermediate transfer belt 56 (Step S11).

Next, the control section 10 detects the density of each of the patches included in the first gradation pattern image formed on the intermediate transfer belt 56 based on the voltage value output from the IDC sensor 70A (Step S12). The detection result of the density of each of the patches is stored in the storage section 80 by the control section 10.

Then, the control section 10 creates the first correction curve (the correction curves for the respective colors of Y, M, C and K) based on the detection result of the density of each of the patches detected by the IDC sensor 70A (Step S13). The created first correction curve is stored in the correction curve storage section 82 by the control section 10.

Returning to FIG. 7, the control section 10 then executes the gradation correction processing by the output sheet sensor (Step S4).

Figure 9:
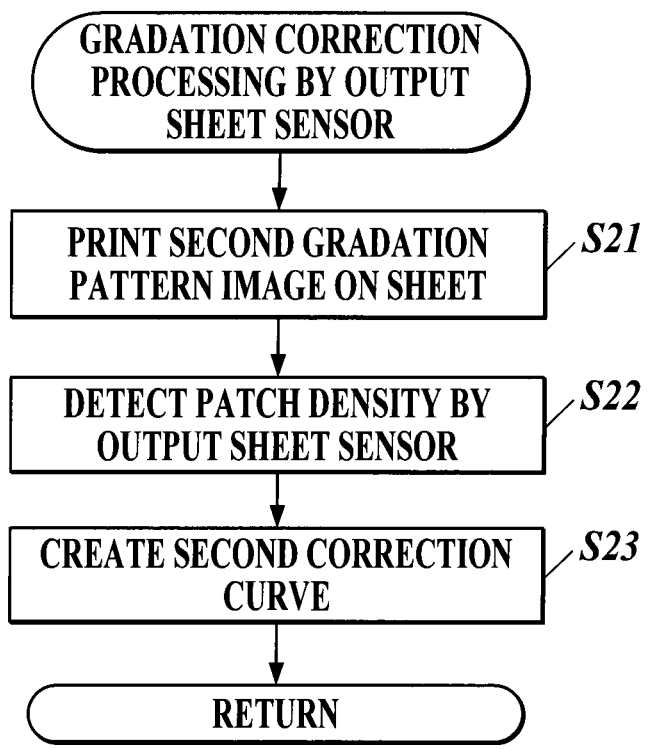
FIG. 9 is a flowchart showing a gradation correction processing by the output sheet sensor.

With reference to FIG. 9, the gradation correction processing will be described.

First, the control section 10 reads the second gradation pattern image form the gradation pattern image storage section 81, and controls the image forming section 50 to print the read second gradation pattern image on the sheet (Step S21).

Next, the control section 10 detects the density of each of the patches included in the second gradation pattern image printed on the sheet based on the voltage value output from the output sheet sensor 70B (Step S22). The detection result of the density of each of the patches is stored in the storage section by the control section 10.

Then, control section 10 creates the second correction curve (the correction curves for the respective colors of Y, M, C and K) based on the detection result of the density of each of patches detected by the output sheet sensor 70B (Step S23). The created second correction curve is stored in the correction curve storage section 82 by the control section 10.

Returning to FIG. 7, the control section 10 then adds the gradation correction result (the first correction curve) by the IDC sensor 70A to the gradation correction result (the second correction curve) by the output sheet sensor 70B according to the merge ratio stored in the storage section 80, and creates the final correction curve (Step S5).

After Step S5, or in Step S2, when the counter value is not divisible by the correction interval (Step S2: NO), the image forming section 50 executes printing according to the control by the control section 10 (Step S6). At that time, the control section 10 corrects the gradation characteristics of the image forming section 50 based on the correction curve created in Step S5.

Then, the control section 10 increments the counter stored in the counter value storage section 83 (Step S7). In the case of single side printing, the value of each counter is increased by one (1), and in the case of both side printing, the value of each counter increased by two. After Step S7, returning to Step 1, the processes are repeated.

In Step S1, when the next print does not exist (Step S1: NO), the processing ends.

As described above, according to the image forming apparatus 100 of the embodiment, by executing the gradation correction of the image forming section 50 based on the gradation correction result by the IDC sensor 70A and the gradation correction result by the output sheet sensor 70B, a gradation stability can be secured. In addition, compared to the case where the gradation correction is executed only based on the detection result by the output sheet sensor 70B, the number of the sheets to be output for the gradation correction can be reduced.

Since toner transfer/fixation characteristics vary depending on the kind of sheet to be actually output on lower density side, the gradation easily becomes unstable. For this reason, the ratio of the gradation correction result by the output sheet sensor 70B is set to be higher on a lower density side, and when the input value is equal to or more than the adjustment value, only the gradation correction result by the IDC sensor 70A is used. By this, since only the densities of the patches on lower density side are detected by the output sheet sensor 70B, the gradation stability can be effectively maintained, and the number of the sheets to be output for the gradation correction can be reduced.

Moreover, by allowing the adjustment value to be specified from the operation display section 20, a user can specify the radio for adding the gradation correction result by the IDC sensor 70A to the gradation correction result by the output sheet sensor 70B.

Furthermore, since the gradation correction of the image forming section 50 is performed every time the printings of the predetermined number of times are executed, the gradation stability can be maintained.

Incidentally, the above descriptions of the embodiment are merely examples of the image forming apparatus according to the present invention, and the present invention is not limited to the above. The detailed configuration and operations of each of the sections constituting the image forming apparatus can be appropriately changed without departing from the spirit of the present invention.

For example, the merge ratio between the gradation correction result by the IDC sensor 70A and the gradation correction result by the output sheet sensor 70B is not limited to the example shown in FIG. 6 as long as a sum of the ratios of both of the gradation correction results with respect to the same input value is 100%.

Though the case where the merge ratio between the gradation correction result by the IDC sensor 70A and the gradation correction result by the output sheet sensor 70B varies depending on the density as shown in FIG. 6 is described in the above embodiment, the merge ratio between the gradation correction result by the IDC sensor 70A and the gradation correction result by the output sheet sensor 70B may be constant regardless of the density. This constant merge ratio may be specified by a user.

Although the gradation correction result by the IDC sensor 70A and the gradation correction result by the output sheet sensor 70B are added according to the merge ratio when creating the correction curve in the embodiment, it is also possible to use only the gradation correction result of one of the sensors.

Figure 10:
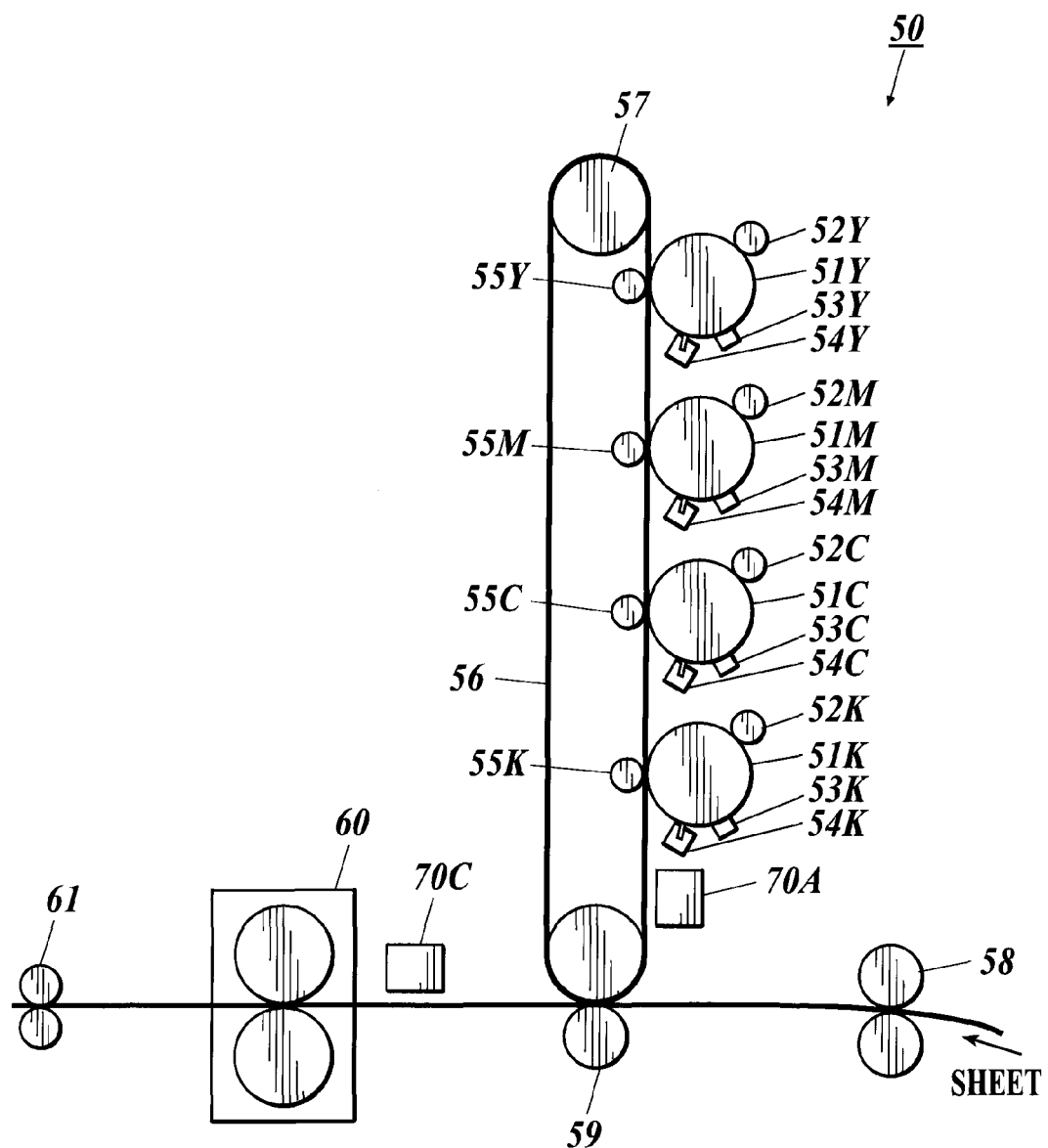
FIG. 10 is an example of the image forming section provided in a preceding stage.

Though the example where the output sheet sensor 70B is provided in the sequence stage with respect to the fixation unit 60 is described in the above embodiment, as shown in FIG. 10, the output sheet sensor 70C can be provided in a subsequent stage with respect to the secondary transfer roller 59 and in a preceding stage with respect to the fixation unit 60. In this case, the output sheet sensor 70C outputs the voltage value depending on the density of each of the patches of a pre-fixed second gradation pattern image to the control section 10.

In the above description, the example where the ROM is used as a computer readable medium storing the program for executing the respective processes is described, but the present invention is not limited to this example. As another computer readable media, also a nonvolatile memory such as a flash memory and a portable recording medium such as a CD-ROM can be applied. In addition, as a medium which provides program data through a communication line, also carrier wave can be applied.

According to one aspect of the preferred embodiment of the present invention, there is provided an image forming apparatus including:

an image forming section to form an toner image on an image carrier, and to transfer the formed toner image on a sheet;

a first density sensor to detect a density of the toner image formed on the image carrier;

a second density sensor to detect a density of the toner image transferred on the sheet; and a control section to control the image forming section to form a first gradation pattern image including a plurality of patches having different densities on the image carrier, to execute gradation correction of the image forming section based on a detection result obtained by detecting the density of each of the patches included in the first gradation pattern image formed on the image carrier with the first density sensor, to control the image forming section to print a second gradation pattern image including a plurality of patches having different densities on the sheet, and to execute gradation correction of the image forming section based on a detection result obtained by detecting the density of each of the patches included in the second gradation pattern image printed on the sheet with the second density sensor, and wherein the control section adds a gradation correction result by the first density sensor to a gradation correction result by the second density sensor according to a predetermined ratio, and executes gradation correction of the image forming section based on an addition result.

By this image forming apparatus, by executing gradation correction of the image forming section based on the gradation correction result by the first density sensor and the gradation correction result by the second density sensor, gradation stability can be ensured. Moreover, compared with the case of executing gradation correction using only the gradation correction result by the second density sensor, the number of sheets to be output for gradation correction can be reduced.

Preferably, the predetermined ratio varies depending on the density, and a ratio of the gradation correction result by the second density sensor gets higher on a lower density side.

Preferably, the predetermined ratio can be specified by a user.

Preferably, the gradation correction of the image forming section is performed every time printings of the predetermined number of times are executed by the image forming section.

The present U.S. patent application claims a priority under the Paris Convention of Japanese patent application No. 2010-087503 filed on 6 Apr. 2010, which shall be a basis of correction of an incorrect translation.

What is claimed is:

1. An image forming apparatus comprising:
an image forming section to form a toner image on an image carrier, and to transfer the formed toner image on a sheet;
a first density sensor to detect a density of the toner image formed on the image carrier;
a second density sensor to detect a density of the toner image transferred on the sheet; and
a control section to control the image forming section to form a first gradation pattern image including a plurality of patches having different densities on the image carrier, to execute gradation correction of the image forming section based on a detection result obtained by detecting the density of each of the patches included in the first gradation pattern image formed on the image carrier with the first density sensor, to control the image forming section to print a second gradation pattern image including a plurality of patches having different densities on the sheet, and to execute gradation correction of the image forming section based on a detection result obtained by detecting the density of each of the patches included in the second gradation pattern image printed on the sheet with the second density sensor, and
wherein the control section adds a gradation correction result by the first density sensor to a gradation correction result by the second density sensor according to a predetermined ratio, and executes gradation correction of the image forming section based on an addition result.

2. The image forming apparatus of claim 1, wherein the predetermined ratio varies depending on the density detected by the second density sensor, and a ratio of the gradation correction result by the second density sensor gets higher on a lower density side.

3. The image forming apparatus of claim 1, wherein the predetermined ratio can be specified by a user.

4. The image forming apparatus of claim 1, wherein the gradation correction of the image forming section is performed every time printings of the predetermined number of times are executed by the image forming section.

* * * * *

UNITED STATES PATENT AND TRADEMARK OFFICE
CERTIFICATE OF CORRECTION

PATENT NO. : 8,553,300 B2  
APPLICATION NO. : 13/079147  
DATED : October 8, 2013  
INVENTOR(S) : Makoto Oki Page 1 of 1

It is certified that error appears in the above-identified patent and that said Letters Patent is hereby corrected as shown below:

On the Title Page, Item (65), "Prior Publication Data," insert the following:

--(30)      Foreign Application Priority Data
      April 6, 2010 (JP)...............................2010-087503--.

Signed and Sealed this
Twenty-fourth Day of March, 2015

Michelle K. Lee
*Director of the United States Patent and Trademark Office*